US005973608A

United States Patent [19]

McMahon

[11] Patent Number: 5,973,608
[45] Date of Patent: Oct. 26, 1999

[54] REMOTELY ACTIVATED ELECTRICAL CONTROL ARRANGEMENT

[76] Inventor: David S. McMahon, 479 Neiffer Rd, Schwenksville, Pa. 19473

[21] Appl. No.: 08/840,615

[22] Filed: Apr. 29, 1997

[51] Int. Cl.[6] .................... H04B 3/54

[52] U.S. Cl. .................... 340/825.06; 340/825.07; 340/561; 340/565; 340/635; 307/116; 307/117; 307/125; 307/130; 315/224; 315/245; 375/310

[58] Field of Search .................... 340/825.06, 825.07, 340/561, 565, 635, 328; 307/116, 117, 125, 130; 315/224, 245; 375/310

[56] References Cited

U.S. PATENT DOCUMENTS

| | | | |
|---|---|---|---|
| 4,099,118 | 7/1978 | Franklin et al. | 324/61 R |
| 4,200,862 | 4/1980 | Campbell et al. | 340/825.07 |
| 4,464,622 | 8/1984 | Franklin | 324/67 |
| 4,535,254 | 8/1985 | Khatri | 307/114 |
| 4,672,229 | 6/1987 | Skarman et al. | 307/116 |
| 4,831,279 | 5/1989 | Ingraham | 307/116 |
| 5,716,129 | 2/1998 | Kunen et al. | 307/116 |

*Primary Examiner*—Brian Zimmerman
*Assistant Examiner*—Yves Dalencourt
*Attorney, Agent, or Firm*—Joseph W. Molasky & Associates

[57] ABSTRACT

An arrangement for controlling the activation of an electrical appliance. The arrangement utilizes a capacitive sensor to recognize the physical proximity of a user (e.g., a hand) to an internal capacitive sensing means. The capacitive change is applied as an input to an electrical control circuit so as to ultimately provide an electrical control signal to an associated electrical appliance. The arrangement does not require direct physical contact to activate any appliance, and may be used to control various power levels associated with a particular electrical appliance (e.g., light intensity for a "dimmer" switch, sound volume for an audio system, activation and trigger signals to an alarm system). The arrangement may be embedded within the wall of a structure (i.e., not visible) and still provide the capacitively-activated control function.

15 Claims, 4 Drawing Sheets

FIG. 1
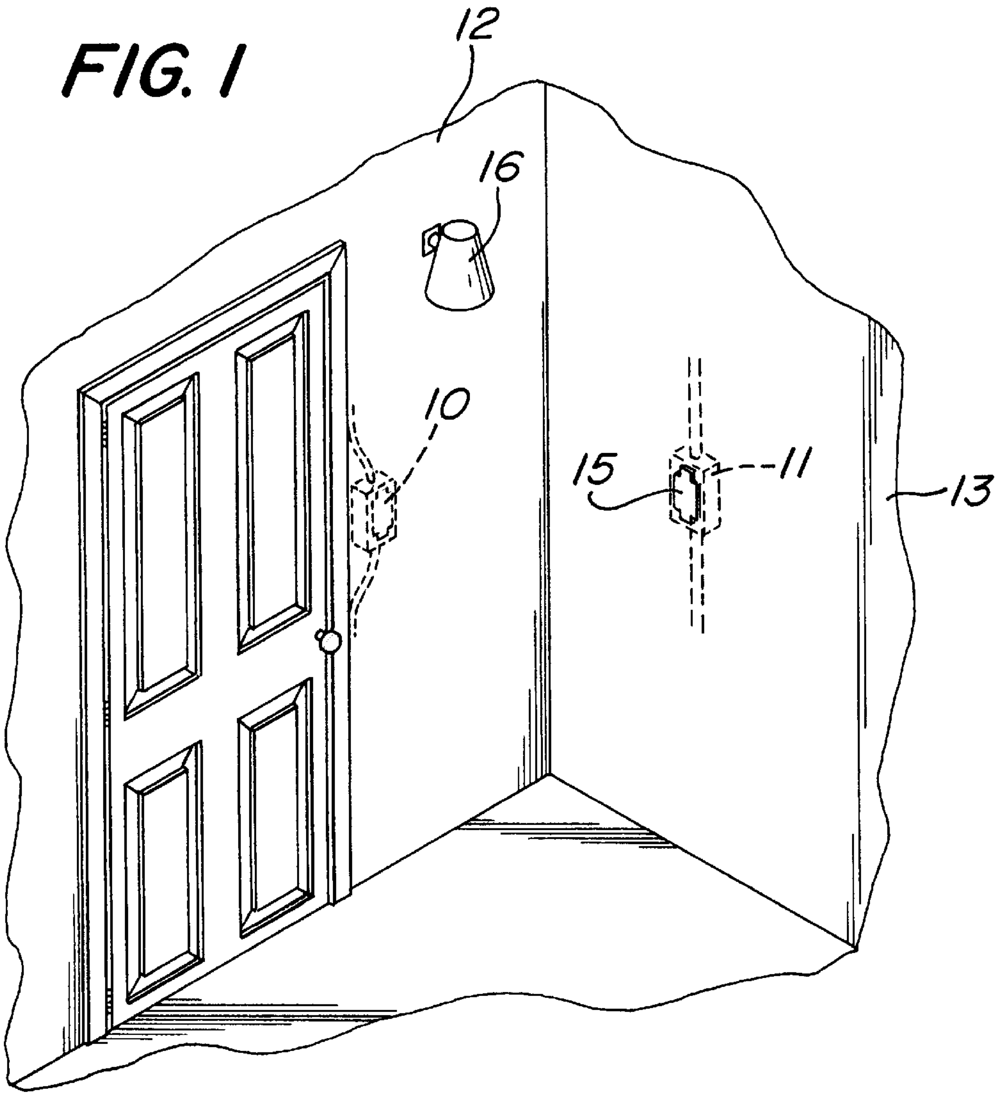
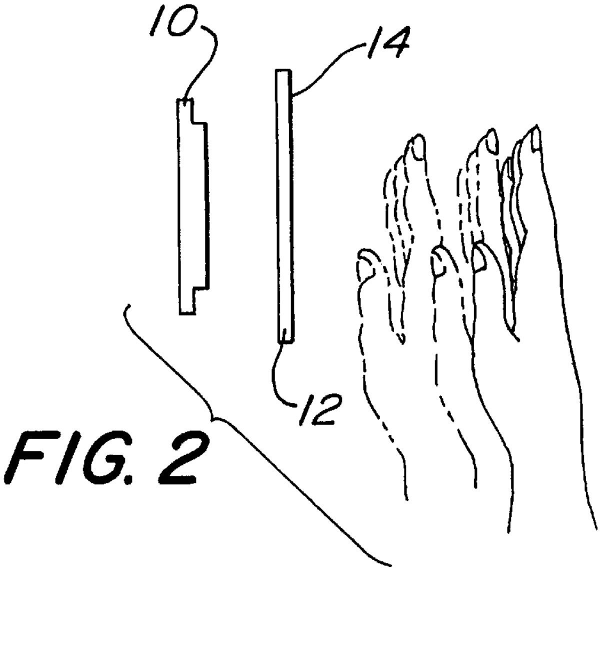
FIG. 2

REMOTELY ACTIVATED ELECTRICAL CONTROL ARRANGEMENT

BACKGROUND OF THE INVENTION

1. Field of the Invention

The present invention relates to a remotely activated electrical control arrangement and, more particularly, to an electrical control unit such as a wall switch or other means for controlling electrical appliances, where the control unit comprises capacitive sensing means capable of activating the associated appliance without the need to physically contact the control unit.

2. Description of the Prior Art

There exist a number of arrangements for controlling the activation of electrical appliances other than a traditional "on/off" switch. For example, there are arrangements that are sound activated (i.e., "clapping" near a light to turn it "on" and "off"). Motion sensors may also be used to activate certain electrical appliances, such as alarm systems.

There remains, however, a number of situations that are not suitable for using either sound or motion detectors. Additionally, there exists a problem related to the inclusion of electrical control units, for example, wall switches, in historic structures. Although switchplates and the requisite electronics may be attached to the walls in these buildings, the mere appearance of such devices detracts from the historical "look" of the building. Further, in certain applications, such as alarm systems, it is extremely advantageous to be able to "hide" the location of electronic devices (e.g., the alarm sensors). A separate problem is directed to the need to run a large quantity of high voltage wiring through construction—either old construction or new.

SUMMARY OF THE INVENTION

The need remaining in the prior art is addressed by the present invention, which relates to a remotely activated electrical control arrangement and, more particularly, to an electrical control unit such as a wall switch or other means for controlling electrical appliances, where the control unit comprises capacitive sensing means capable of activating the associated appliance without the need to physically contact the control unit.

It is an aspect of the present invention to utilize a capacitive arrangement capable of sensing the proximity of a hand to the control unit. As the hand nears the unit, the capacitive coupling will change and the unit will be activated. In a particular illustrative embodiment, the unit may control a "light dimmer" such that the control unit functions to increase the intensity of the light as the hand moves closer to the unit. A similar arrangement may be utilized to control the volume of an audio system (that is, as a hand comes closer to the unit, the volume increases; as the hand is drawn away, the volume decreases).

An advantage of the capacitive control unit of the present invention is that the unit may be completely embedded within a wall or similar structure—no outer indication that an electrical control unit is contained within the wall is necessary. In many historical buildings, as well as in alarm system applications, the ability to "hide" the electrical control units is particularly advantageous.

In an alternative embodiment of the present invention, a plurality of such control units may be located throughout a structure, wherein the plurality of units are controlled by a single main power structure located in an accessible location, such as a basement. By removing essentially all of the requisite electronics to one, accessible area, the need to provide maintenance work on the control unit itself is significantly reduced.

Other and further embodiments and advantages of the present invention will become apparent during the course of the following discussion and by reference to the accompanying drawings.

BRIEF DESCRIPTION OF THE DRAWINGS

Referring now to the drawings, where like numerals represent like parts in several views, FIG. 1 illustrates an exemplary arrangement for utilizing the control unit of the present invention, in this particular example showing a first control unit embedded within a wall and a second control unit disposed at the wall's surface;

FIG. 2 is a cut-away side perspective of the embedded control unit of FIG. 1, illustrating in particular the variations in hand placements for activating the unit;

DETAILED DESCRIPTION OF THE PREFERRED EMBODIMENTS

Figure 3:
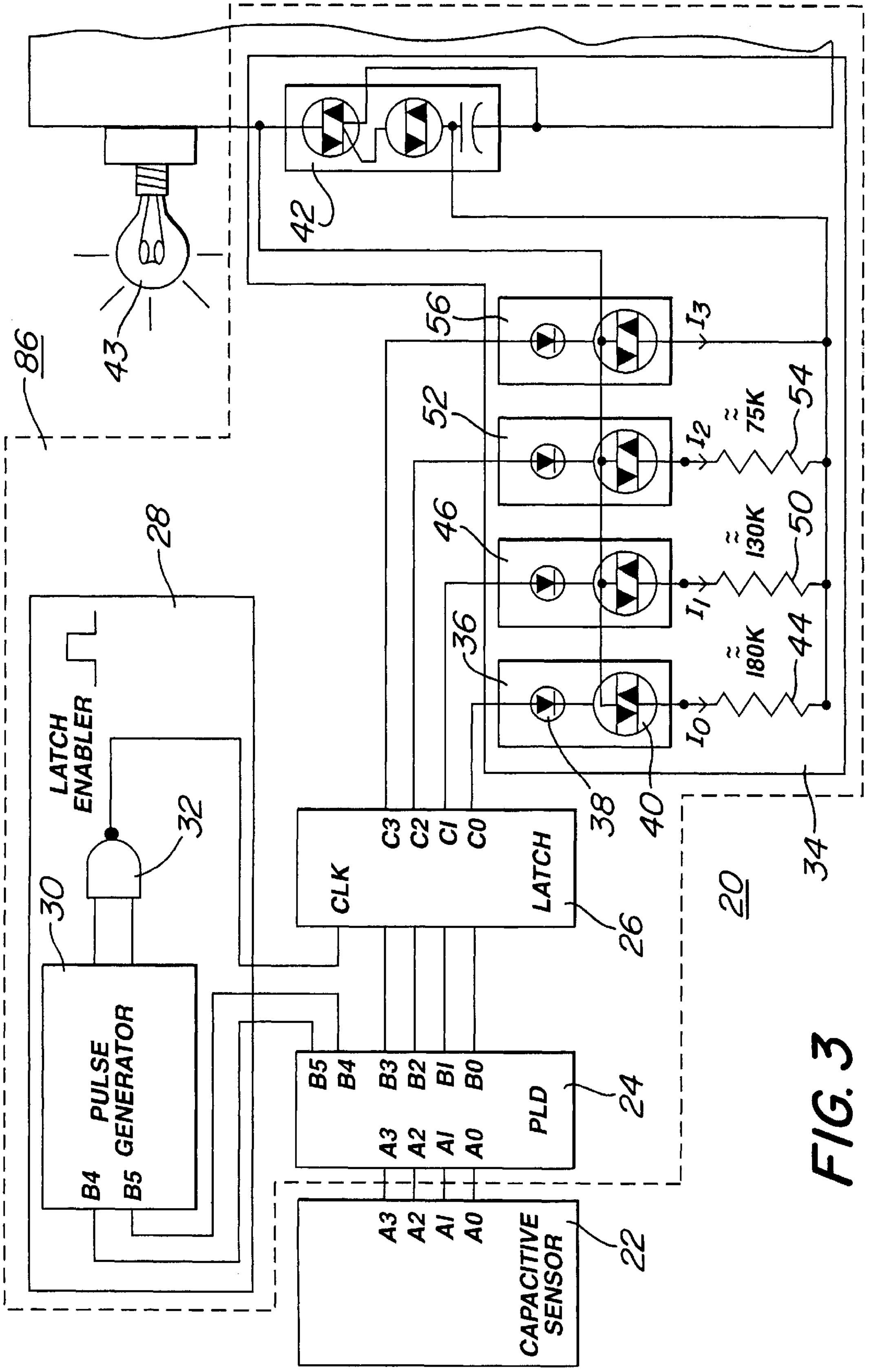
FIG. 3 is a schematic diagram of the circuitry associated with an exemplary control unit of the present invention.

FIG. 1 contains a cut-away view in perspective illustrating the relative positions of two exemplary control units 10,11 of the present invention. In this particular arrangement, control unit 10 is embedded within a wall 12 of a structure. As seen in particular in FIG. 2, control unit 10 may be located approximately six inches (for example) behind surface 14 of wall 12. Referring back to FIG. 1, control unit 11 is illustrated as being flush with surface 15 of wall 13. It is an advantage of the design of the present invention that either arrangement (hidden or exposed) may be used, depending only upon an individual's choice.

In order to activate control unit 10 or 11, as will be described in detail below in association with the schematic diagram of FIG. 3, a hand (or any part of the body) must come within a predetermined distance of the unit, for example, 6 inches (a "first" zone, as indicated in FIG. 2). At this location, the capacitive coupling is sufficient to activate the unit. It is to be understood that the proximity of the hand to an exemplary control unit sufficient to actuate an associated electrical appliance is a function of the particular components utilized to form the control unit; the distance of six inches mentioned above is for illustrative purposes only.

In the particular arrangement illustrated in FIGS. 1 and 2, control unit 10 (or 11) may be used as a dimmer switch to control a lighting fixture 16. Therefore, once the hand is within a first predetermined zone with respect to control unit to, lighting fixture 16 will turn "on"—at its lowest lighting level. As the hand moves closer, into zone 2 for example, the coupling will increase, resulting in switching lighting fixture 16 to the next lighting level. This process will continue for as many lighting levels as are available between full "off" and full "on". A similar process—operating in reverse—may then be used to decrease the light intensity until fixture 16 is fully "off" again. That is, starting with a hand in closest proximity to control unit 10 (or 11), the hand may be pulled away so as to increase the separation between the hand and the control unit, reducing the capacitance at the sensor and thereby decreasing the light intensity. As mentioned above, a similar arrangement may be used to control the volume of an audio system. Alternatively, as will be discussed in detail below in association with FIG. 4, the system of the present invention may be simplified so as to only provide "on" and "off" functionality.

Referring now to FIG. 3, a particular arrangement of electronics associated with the control unit of the present invention will be described in detail. As shown, an exemplary control unit 20 comprises a capacitive sensor means 22, the output of which is coupled to the input of a programmable logic device (PLD) 24. The output from PLD 24 is subsequently applied as an input to a latch 26, where latch 26 is controlled by a latch enable circuit 28. In operation, capacitive sensor means 22 functions in a manner similar to "stud finders" (such as described in U.S. Pat. No. 4,464,622 and herein incorporated by reference). Sensor means 22 includes a first capacitive plate and associated electronics (not shown) that are capable of sensing changes in the dielectric constant between the plates of the sensor. In the arrangement of the present invention, a human hand is used as the second "plate" of the capacitor. Therefore, as the hand nears the first plate, the coupling between the hand and the capacitor plate within sensor 22 will increase. The capacitive reading thus forms the output of sensor 22. It is to be understood that there are many arrangements that may be utilized to forming the capacitive sensing means of the present invention; the dual plate description discussed above is intended as exemplary only. In the particular embodiment illustrated in FIG. 1, output from sensor 22, indicating the value of capacitive coupling between the hand and the sensor, is a four-digit decimal number, with $A_0$ being the least significant digit and $A_3$ being the most significant digit. As shown, the four outputs $A_0$–$A_3$ are subsequently applied as inputs to PLD 24. PLD 24 is utilized in the arrangement of the present invention to prevent crosstalk between the four signal lines, as well as to prevent the spurious activation of the control unit during "power up" of the control unit, or power line fluctuations. In particular, PLD 24 will function as a "memory reset" of control unit 20 should a power outage occur. Otherwise, the functioning of control unit 20 would be erratic as power is restored. PLD 24 functions, in general, to pass along the received input "A" values as outputs along lines $B_0$–$B_3$. Simultaneously, PLD 24 sends logic gating signals, denoted as output signals $B_4$ and $B_5$, to latch enabler circuit 28. Latch enabler circuit 28 is utilized to maintain latch 26 in a particular state until a change in output signals $A_0$–$A_3$ occurs. Without latch enabler 28, latch 26 would quickly switch between logic states, since the output from sensor 22 is of relatively short duration. Latch enabler 28 thus functions to "hold" a particular latch state until the next increase/decrease signal is generated by sensor 22.

As shown in FIG. 3, latch enabler 28 comprises a pulse generator 30 and a NAND gate 32, where logic gating signals $B_4$ and $B_5$ are applied as separate inputs to pulse generator 30. The combination of pulse generator 30 and NAND gate 32 thereby results in creating a latch enable pulse P of sufficient length (for example, between 100 msec and 1 sec) so as to allow for sensor 22 to output the next change in relative displacement between a hand and the control unit. Latch enable pulse P is therefore applied as a clock input to latch 26 such that for the duration of latch enable pulse P, any output along lines $B_0$–$B_3$ from PLD 24 will appear as the associated output $C_0$–$C_3$ of latch circuit 26.

Figure 4:
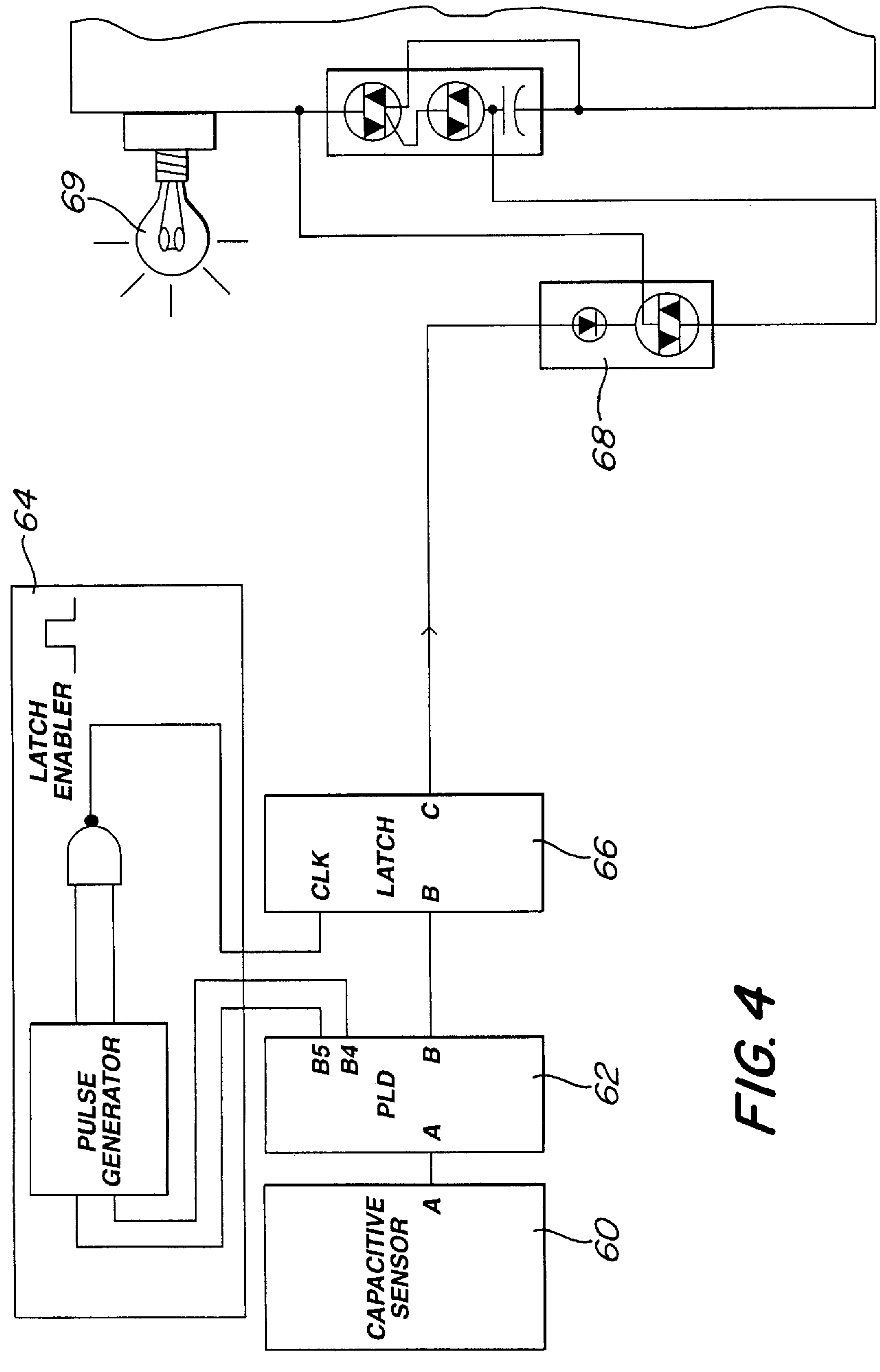
FIG. 4 is a schematic diagram of the circuitry associated with a simple "on"/"off" embodiment of the present invention.

Outputs $C_0$–$C_3$ from latch 26 are thus considered as the "output control" signals for the remote activation arrangement of the present invention. However, since these signals are logic signals of relatively low voltage levels, they are insufficient to directly control most electrical appliances. Therefore, in accordance with the teachings of the present invention, an electrical switch unit 34 is connected between the output of latch 26 and the associated electrical appliance, where switch unit 34 functions to apply an acceptable voltage level signal to directly control the appliance. It is to be understood that various switch arrangements may be utilized to perform this function, the embodiments illustrated in FIGS. 3 and 4 are considered to be exemplary only.

Referring to FIG. 3, switch unit 34 is formed to include a plurality of optically isolated switches. In particular, output line $C_0$ is applied as an input to a first optically isolated switch 36, switch 36 comprising a series combination of an LED/photodiode 38 and a triac 40. Thus, when output line $C_0$ receives a signal of logic "1" (indicating the presence of a hand in a first proximity position to sensor 22), LED/photodiode 38 will turn "on" and activate triac 40. A second terminal of triac 40, as shown in FIG. 3, is coupled to a second triac module 42 and the third terminal of triac 40 is coupled to a first resistor 44, where first resistor 44 is also coupled to a remaining input of triac module 42. Triac module 42 is used, in accordance with the present invention, to supply the requisite input to the electrical appliance. In operation, when output line $C_0$ receives a logic "1" value, LED/photodiode 38 will turn "on", supplying an input current to triac 40 (i.e., "closing" switch 36). A current will pass through triac 40 and first resistor 44 to supply a bias voltage to triac module 42. The value of first resistor 44 is selected, for an exemplary arrangement wherein it is desired to control a "dimming" light switch, so as to supply the bias voltage required to provide the lowest intensity to the associated light 43.

As a hand comes within a second, closer zone of sensor 22, output line $A_1$ will change from a logic "0" to a logic "1" value (output line $A_0$ returning to a logic "0" level), where this value of logic "1" will pass through to associated output line $B_1$ of PLD 24. The logic "1" along $A_1$ will also serve to change the logic levels of logic gating signals $B_4$ and $B_5$, where these pulses then control latch enable circuit 28 to provide a new latch enable pulse P, which is utilized as the clocking input to latch circuit 26. Therefore, once a latch enable pulse P is received as a clock input by latch 26, the logic "1" value along line $B_1$ will be passed through to output line $C_1$, where output line $C_1$ is applied as an input to a second optically isolated switch 46 of the plurality of switches 34. Switch 46 is essentially identical in form and function to first switch 36 described above and, upon receipt of a logic "1" at the input thereto, switches "on" a triac device 48, thereby providing a current $I_1$ to pass through a series resistance 50. As with the first unit described above, both triac 48 and resistor 50 are coupled as separate inputs to triac module 42 and, for the particular value of resistor 50, provide an increase in supply voltage to the appliance coupled to triac module 42.

In a similar fashion, as a hand comes within a closer zone of sensor 22, output line $A_2$ would reach a logic "1" value (output line $A_1$ then returning to a logic "0" value), and the arrangement as previously described would function in a similar manner—the logic "1" would propagate along lines $A_2$ and $B_2$ through PLD 24 and latch 26, appearing at the output of latch 26 upon the receipt of a new latch enable pulse P from latch enable circuit 28. The output line $C_2$, as shown in FIG. 3, is subsequently applied as an input to a third optically isolated switch 52 so as to provide a current $I_2$ through a third resistor 54, where the value of third resistor 54 is chosen so as to bias triac module 42 at a voltage level required to allow for the intensity of light fixture 43 to further increase. Ultimately, the hand approaches sensor 22 to within a zone sufficient to allow for output line $A_3$ to be activated. Following a process similar to that described above, output $A_3$ subsequently results in output line $C_3$ from latch circuit 26 to reach a logic "1" state. As shown in FIG. 3, output line $C_3$ is applied as an input to a fourth optically isolated switch 56, producing an output current $I_3$. In this instance, since this last zone is associated with light 43 being fully "on", there is no additional impedance included in the line coupling switch 56 to light fixture 43.

The following table contains a logic diagram illustrating the various states of each of the exemplary output lines described above:

| SENSOR 22 | | | | PLD 24 | | | | LATCH ENABLE: PULSE TRIGGERS | | LATCH ENABLE: $C_{LE}$ | | SWITCH ENABLE | | | |
|---|---|---|---|---|---|---|---|---|---|---|---|---|---|---|---|
| $A_0$ | $A_1$ | $A_2$ | $A_3$ | $B_0$ | $B_1$ | $B_2$ | $B_3$ | $B_4$ | $B_5$ | ↓ | ↑ | $C_0$ | $C_1$ | $C_2$ | $C_3$ |
| 0 | 0 | 0 | 0 | 0 | 0 | 0 | 0 | 1 | 1 | 0 | P | 0 | 0 | 0 | 0 |
| 1 | 0 | 0 | 0 | 1 | 0 | 0 | 0 | 0 | 1 | P | P | 1 | 0 | 0 | 0 |
| 0 | 1 | 0 | 0 | 0 | 1 | 0 | 0 | 1 | 0 | P | P | 0 | 1 | 0 | 0 |
| 0 | 0 | 1 | 0 | 0 | 0 | 1 | 0 | 0 | 1 | P | P | 0 | 0 | 1 | 0 |
| 0 | 0 | 0 | 1 | 0 | 0 | 0 | 1 | 1 | 0 | P | 0 | 0 | 0 | 0 | 1 |

As mentioned above, the capacitive control arrangement of the present invention may be utilized to control any type of electrical appliance, and can be used to merely to control the "on" and "off" states of any desired appliance. In particular, when used in an "on"/"off" mode, the arrangement of FIG. 3 may be modified as shown in FIG. 4. In particular, a capacitive sensor 60 is formed so as to include only a single output line A. Output line A is applied as the input to a PLD 62 to activate an associated output line B (as well as the requisite trigger signals $B_4$ and $B_5$). As with the arrangement of FIG. 3, output line B is coupled to the input of a latch 66. A pulse P from a latch enabler circuit 64 is also applied as an input to latch 66, which would then allow for an output signal C to become a logic "1" value so as to turn "on" an optically isolated switch, such as switch 68 of FIG. 4. The activation of switch 68 thus functions to turn "on" the associated electrical device 69, where device 69 may be a light, an alarm system, or any other appropriate electrical appliance. Electrical device 69 would then turn off upon the next occasion of a hand, in proximity to sensor 60, moving in an outward direction, thus providing a logic "0" output to line A, ultimately forming a trigger pulse to allow the logic "0" value to pass to output C from latch 66 and thus turn "off" the associated optical switch.

Figure 5:
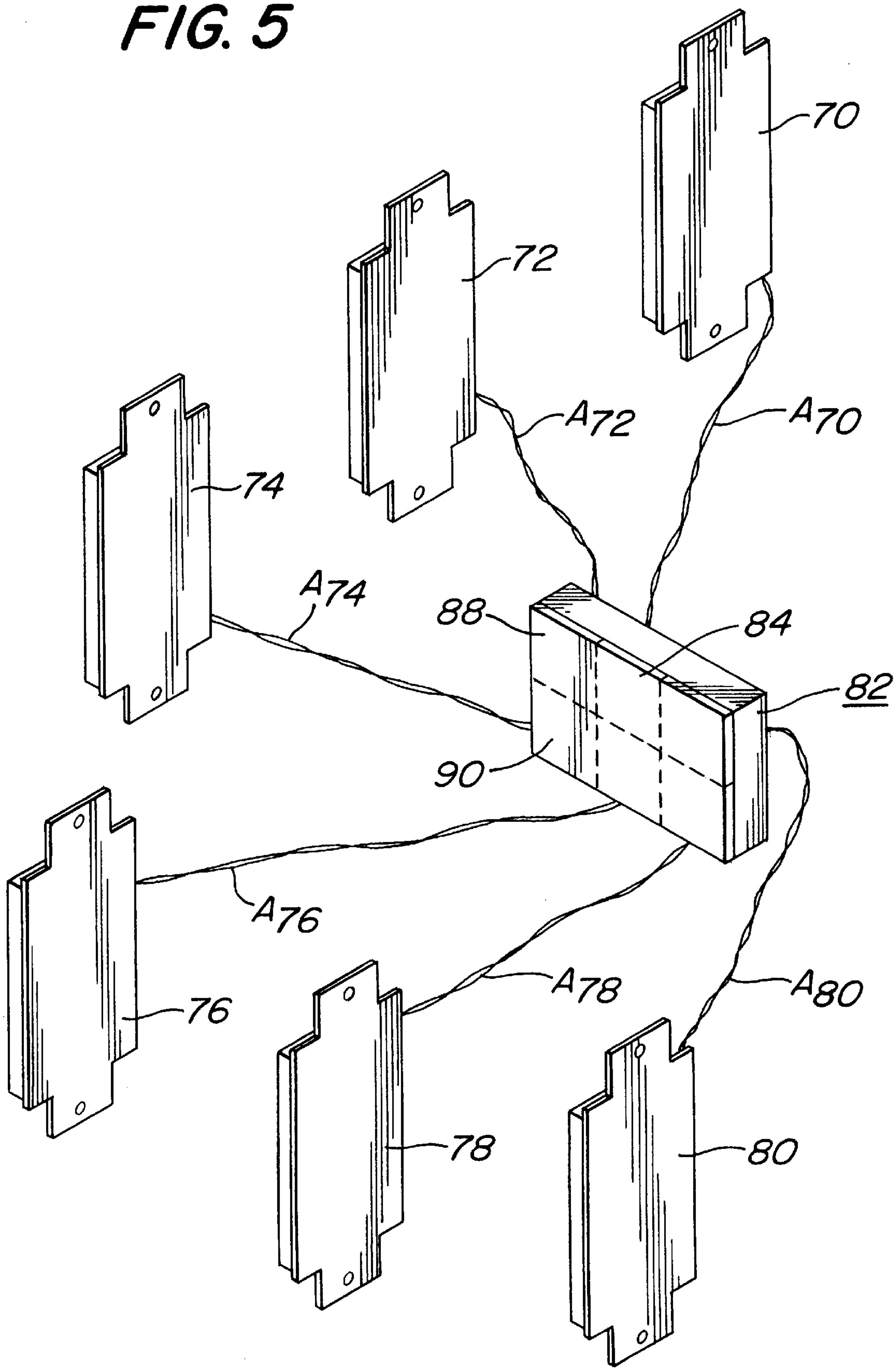
FIG. 5 illustrates an alternative embodiment of the present invention utilizing a plurality of such control units all coupled to a single, remotely located main power structure.

In an alternative embodiment of the present invention, the various components associated with an exemplary control (except for the sensor) may be disposed at a location remote from the actual appliance, with only the need to extend output lines A (low voltage data lines) from the sensor to the remainder of the control unit circuitry. This particular feature of the present invention is advantageous for circumstances where a number of separate appliances are to be controlled utilizing the arrangement of the present invention. FIG. 5 illustrates an exemplary arrangement useful for controlling such a number of separate devices. In particular, the arrangement as shown in FIG. 5 contains a plurality of separate sensors 70, 72, 74, 76, 78 and 80, where each sensor is utilized to control a separate electrical appliance. For example, sensor 70 may be used to control a "dimming" room lighting fixture, such as described above in associated with FIGS. 1–3. Sensor 72, located in the same room as sensor 70 (i.e., similar to control units 10,11 of FIG. 1) may be utilized to control an audio unit, such as a stereo (including volume control, as well as "on"/"off" functionality). Sensor 74 may be utilized to control the "on" and "off" positions of an outdoor light, sensor 76 for activating or, alternatively, triggering an "alarm" in an alarm system ("on" and "off" only), and sensors 78 and 80 for various other electrical appliances. It is to be understood that the nature of the particular electrical appliance is of no concern to the practice of the present invention. Additionally, it is of no significance to the practice of the present invention as to whether the actual sensor is "visible" (like control unit 11 of FIG. 1) or embedded within a wall (like control unit 10 of FIG. 1); the capacitive coupling required to activate the sensor will function in either case. Therefore, if desired, an arrangement of the present invention may utilize a "blank" switchplate as the cover for the sensor, where the switchplate (or other decorative plate) is visible to the user.

Referring to FIG. 5, associated with each sensor is a set of output lines A, where output lines $A_{70}$ are the output lines from sensor 70 (and would include four individual output lines, similar to output lines $A_0$–$A_3$ illustrated in FIG. 3, as well as the requisite DC power supply lines). Similarly, output lines $A_{72}$ are associated with sensor 72, and so on, with output lines $A_{80}$ exiting from sensor 80. It is an advantage of the arrangement of the present invention that all of these low voltage supply/data lines (which are not usually subject to deterioration in performance) are run through the building structure and all terminate in a single power control structure 82, as shown in FIG. 5. Power control structure 82 includes separate control means for activating the electrical appliance associated with each particular sensor. That is, power control structure 82 includes a first control means 84 associated with sensor 70, where the control means 84 is similar to the combination of PLD 24, latch 26, pulse generator 28 and switch enabler 34 of FIG. 3 (this combination being defined as a "remote control unit" and illustrated by the numeral 86 in FIG. 3). A separate (but similar in design) remote control unit 88 is utilized to control the appliance associated with sensor 72. A simplified "on" "off" circuit 90, configured as illustrated in FIG. 4, is utilized to control sensor 74, and so on, with each sensor coupled to a separate remote control unit (via its output line(s) A) contained within single power control structure 82. It is an advantage of the arrangement of the present invention that all of the active electronics required to provide the functionality of the present invention may be co-located in one, remote accessible location (since the sensors are essentially passive devices) such that any maintenance or repair of the unit is relatively simple to perform.

Other and further arrangements of the present invention may be obvious to those of ordinary skill in the art and are considered to fall within the scope of the present invention.

What is claimed is:

1. A control unit for remotely activating an electrical appliance as a function of the physical proximity of a user to said control unit, said control unit comprising:

capacitive sensing means including a capacitive sensor and associated operational electronics, for providing an output logic signal (A) when a change in the capacitance reaches a predetermined level as a function of the physical proximity of a user to said capacitive sensing means;

programmable logic means, responsive to the output of said capacitive means for providing an output control signal (B) and a pair of logic gating signals ($B_4$ and $B_5$);

latching means responsive to the output (B) of said programmable logic means and further including a clock input, said latching means for providing an output of an appliance control signal (C);

latch enabling means responsive to logic gating signals from said programmable logic means for providing a clock pulse (P) output as the clock input to the latching means in a manner, wherein said latching means generates a change in an appliance control output signal only in the presence of a pulse signal P from said latch enabling means; and switching means coupled to the appliance control signal output of said latching means for providing an electrical output control signal to the associated electrical appliance in response to said latching means output signal.

2. The control unit as defined in claim 1 wherein the capacitive sensing means provides a plurality of N separate logic output signals ($A_0$–$A_{N-1}$), wherein only one output of said plurality of N separate logic outputs may comprise a logic "1" value, said only one output indicative of the relative proximity of a user to said capacitive sensing means, where output signal $A_0$ comprising a value of logic "1" indicating a furthest displacement that would activate the electrical appliance and output signal $A_{N-1}$ comprising a value of logic "1" indicating a closest displacement that would activate said electrical appliance;

the programmable logic means is capable of receiving as separate inputs the plurality of N separate logic signals generated by said capacitive sensing means and thereby generating a plurality of separate output signals; and the latching means responsive to the plurality of separate output signals generated by said programmable logic means, said latching means thereby generating, as controlled by the clock pulse signal, a plurality of separate appliance control signals, wherein only one appliance control signal of the plurality of appliance control signals comprises a logic value "1"; and the switching means is responsive to the plurality of N separate appliance control signals and is capable of ascertaining which appliance control signal of the N separate control signals comprises a logic value of "1" and thus controlling the associated electrical appliance as a function of which appliance control signal comprises a value of logic "1".

3. The control unit as defined in claim 2 wherein the output logic signals $A_0$–$A_{N-1}$ are utilized to control an electrical appliance with N different levels of operation.

4. The control unit as defined in claim 3 wherein the control unit is utilized to control the operation of a dimming light fixture, said light fixture including N different levels of light intensity.

5. The control unit as defined in claim 3 wherein the control unit is utilized to control the operation of an audio system, said audio system including N different levels of sound volume.

6. The control unit as defined in claim 1 wherein the capacitive sensing means provides a first logic output of "0" to indicate the associated appliance as being in the "off" state and a second logic output of "1" to indicate the associated appliance as being in the "on" state, wherein a user must be within a predetermined proximity of said capacitive sensing means so as to change the output of said capacitive sensing means from said first logic level to said second logic level.

7. The control unit as defined in claim 1 wherein the latch enabling means comprises a pulse generator and a NAND gate, said pulse generator for receiving as separate inputs the pair of gating signals generated by said programmable logic means, said pulse generator providing a pair of separate output signals that are subsequently applied as separate inputs to said NAND gate, said NAND gate providing as an output a clock pulse P of sufficient duration to allow for changes in outputs from the capacitive sensing means to be recognized.

8. The control unit as defined in claim 7 wherein the clock pulse P comprises a pulse length in the range of 100 msec to 1 second.

9. The control unit as defined in claim 1 wherein the switching means comprises an optically isolated switching arrangement including an LED/photodiode in series with a triac device, said triac coupled at a second terminal to a triac module used to control the associated appliance, said LED/photodiode responsive to the appliance control signal output from said latching means and providing an electrical output current when said appliance control signal comprises a logic value of "1", said electrical output current then utilized to activate the associated electrical appliance.

10. The control unit as defined in claim 9 wherein the switching means further comprises a resistive element, disposed between the triac and the triac module, said resistive element utilized to control the voltage applied to said triac module.

11. The control unit as defined in claim 2 wherein the switching means comprises an optically isolated switching arrangement including a plurality of N LED/photodiode combinations, each LED/photodiode responsive to a separate one of the plurality of N appliance control signal outputs from said latching means, and a plurality of N triacs, wherein one LED/photodiode combination of said plurality of N LED/photodiode combinations provides an electrical output current when said associated appliance control signal comprises a logic value of "1", said electrical output current then utilized to control the associated electrical appliance.

12. An arrangement for controlling a plurality of electrical appliances, said arrangement comprising a plurality of capacitive sensing means, each capacitive sensing means including a first capacitive sensor and associated operational electronics for providing an output logic signal (A) when a change in the capacitance reaches a predetermined level as a function of the physical proximity of a user to said capacitive sensing means;

a centralized power control structure including a plurality of remote control units, each remote control unit associated in a one-to-one relationship with the plurality of capacitive sensing means and each remote control unit for receiving as an output the output logic signal generated by its associated capacitive sensing means, wherein each remote control unit comprises programmable logic means, responsive to the output of the associated capacitive means for providing an output control signal (B) and a pair of logic gating signals ($B_4$ and $B_5$);

latching means responsive to the output (B) of said programmable logic means and further including a clock input, said latching means for providing an output of an appliance control signal (C);

latch enabling means responsive to logic gating signals from said programmable logic means for providing a clock pulse (P) output as the clock input to the latching means in a manner, wherein said latching means generates an appliance control output signal only in the presence of a pulse signal P from said latch enabling means; and switching means coupled to the appliance control signal output of said latching means for providing an electrical output control signal to the associated electrical appliance in response to said latching means output signal.

13. An arrangement as defined in claim 12 wherein at least one remote control unit of the plurality of remote control units functions to process a plurality of N control signals, said at least one remote control unit comprising the capacitive sensing means provides a plurality of N separate logic output signals ($A_0$–$A_{N-1}$), wherein only one output of said plurality of N separate logic outputs may comprise a logic "1" value, said only one output indicative of the relative proximity of a user to said capacitive sensing means, where output signal $A_0$ comprising a value of logic "1" indicating a furthest displacement that would activate the electrical appliance and output signal $A_{N-}$1 comprising a value of logic "1" indicating a closest displacement that would activate said electrical appliance;

the programmable logic means received as separate inputs the plurality of N separate logic signals generated by said capacitive sensing means and thereby generating a plurality of separate output signals; and the latching means responsive to the plurality of separate output signals generated by said programmable logic means, said latching means thereby generating, as controlled by the clock pulse signal, a plurality of separate appliance control signals, wherein only one appliance control signal of the plurality of appliance control signals comprises a logic value "1"; and the switching means is responsive to the plurality of N separate appliance control signals and is ascertained which appliance control signal of the N separate control signals comprises a logic value of "1" and thus controlling the associated electrical appliance as a function of which appliance control signal comprises a value of logic "1".

14. The arrangement as defined in claim 12, wherein at least one remote control unit of the plurality of remote control units is utilized to control only the "off" and "on" states of an associated electrical appliance, the at least one remote control unit comprising capacitive sensing means providing a first logic output of "0" to indicate the associated appliance as being in the "off" state and a second logic output of "1" to indicate the associated appliance as being in the "on" state, wherein a user must be within a predetermined proximity of said capacitive sensing means so as to change the output of said capacitive sensing means from said first logic level to said second logic level.

15. A control unit for activating an electrical appliance wherein the electrical appliance includes four separate operational levels, said control unit activating said electrical appliance by controlling a user's physical proximity to said unit , said control unit comprising:

capacitive sensing means including a first capacitive plate and associated operational electronics, for providing a set of four separate output logic signals ($A_0$–$A_3$) wherein a first output logic signal ($A_0$) will have a value of logic "1" when the physical proximity of a user to said capacitive sensing means reaches a first activation location, a second output logic signal ($A_1$) will have a value of logic "1" when the physical proximity of a user to said capacitive sensing means reaches a second, closer activation location, a third output logic signal ($A_2$) will have a value of logic "1" when the physical proximity of a user to said capacitive sensing means reaches a third, closer activation location, and a fourth output logic signal ($A_3$) will have a value of logic "1" when the physical proximity of a user to said capacitive sensing means reaches a fourth, closest activation location, wherein only one output signal of the set of four output logic signals may comprise a value of logic "1" at any particular time;

programmable logic means, responsive to the output of said capacitive means for providing a set of four output control signals ($B_0$–$B_3$) and a pair of logic gating signals ($B_4$ and $B_5$);

latching means responsive to the set of four output control signals ($B_0$–$B_3$) from said programmable logic means and further including a clock input, said latching means for providing an output or an set of four appliance control signals ($C_0$–$C_3$);

latch enabling means responsive to the pair of logic gating signals from said programmable logic means for providing a clock pulse (P) output as the clock input to the latching means in a manner, wherein said latching means generates a change in an appliance control output signal only in the presence of a pulse signal P from said latch enabling means; and switching means coupled to the set of four appliance control signal outputs of said latching means for providing an electrical output control signal to the associated electrical appliance in response to said latching means output signal, wherein said switching means will provide a first electrical output at a first, lowest level when a first appliance control signal ($C_0$) has a value of logic "1", a second electrical output at a second, higher level when a second appliance control signal ($C_1$) has a value of logic "1', a third electrical output at a third, higher level when a third appliance control signal ($C_3$) has a value of logic "1", and a fourth electrical output at a fourth, highest level when a fourth appliance control signal ($C_4$) has a value of logic "1".

* * * * *